US00RE45808E

(19) United States
(12) Reissued Patent
Sheynblat et al.

(10) Patent Number: US RE45,808 E
(45) Date of Reissued Patent: Nov. 17, 2015

(54) METHOD AND APPARATUS FOR DETERMINING LOCATION OF A BASE STATION USING A PLURALITY OF MOBILE STATIONS IN A WIRELESS MOBILE NETWORK

(75) Inventors: Leonid Sheynblat, Hillsborough, CA (US); Thomas K. Wrappe, Los Gatos, CA (US)

(73) Assignee: QUALCOMM Incorporated, San Diego, CA (US)

(21) Appl. No.: 12/687,411

(22) Filed: Jan. 14, 2010

Related U.S. Patent Documents

Reissue of:

(64) Patent No.: 7,319,878
Issued: Jan. 15, 2008
Appl. No.: 10/971,591
Filed: Oct. 21, 2004

U.S. Applications:

(60) Provisional application No. 60/580,929, filed on Jun. 18, 2004.

(51) Int. Cl.
*H04W 24/00* (2009.01)
*H04W 64/00* (2009.01)

(52) U.S. Cl.
CPC ..... *H04W 64/003* (2013.01)

(58) Field of Classification Search
CPC ..... H04W 64/00; H04W 64/003; H04W 4/02; H04W 4/023
USPC ..... 455/456.1–457, 403, 422.1, 418–420, 455/410, 517, 518, 411
See application file for complete search history.

(56) References Cited

U.S. PATENT DOCUMENTS 5,276,905 A 1/1994 Hurst et al.
5,276,906 A 1/1994 Felix (Continued)

FOREIGN PATENT DOCUMENTS

CA 2296812 A1 8/2000
CN 1334688 A 2/2002

(Continued)

OTHER PUBLICATIONS

3GPP TS 25.305 V7.3.0, (Jun. 2006), 3rd Generation Partnership Project; Technical Specification Group Radio Access Network, "Stage 2 functional specification of User Equipment (UE) positioning in UTRAN (Release 7)," pp. 1-79.

(Continued)

*Primary Examiner* — Wayne Cai
(74) *Attorney, Agent, or Firm* — Thien T. Nguyen

(57) ABSTRACT

A method and apparatus for determining a position of a base station in a wireless communication network that includes a mobile station in communication with base stations. A BTS calibration server is networked with the base stations. A BTS calibration program is programmed into a group of mobile stations that have position location capabilities. Using the BTS calibration program, calibration information may be requested by the BTS calibration server, or a session may be initiated by the mobile station. The BTS calibration program also provides privacy features that allow user of the mobile station to prevent it from being used for base station location. If authorized, the BTS calibration program determines the position of the mobile station, and provides calibration information, such as position and base station phase measurements, to the server. The calibration information may be used to calibrate the base station almanac.

75 Claims, 6 Drawing Sheets

(56) References Cited

U.S. PATENT DOCUMENTS 5,327,144 A 7/1994 Stilp et al.
5,512,908 A 4/1996 Herrick
5,708,975 A 1/1998 Heiskari et al.
5,717,406 A 2/1998 Sanderford et al.
5,805,581 A 9/1998 Uchida et al.
5,812,087 A 9/1998 Krasner
5,841,396 A 11/1998 Krasner
5,874,914 A 2/1999 Krasner
5,945,944 A 8/1999 Krasner
5,999,124 A 12/1999 Sheynblat
6,055,434 A 4/2000 Seraj
6,061,018 A 5/2000 Sheynblat
6,091,362 A 7/2000 Stilp et al.
6,108,558 A 8/2000 Vanderspool, II
6,111,538 A 8/2000 Schuchman et al.
6,128,492 A 10/2000 Chung
6,147,644 A 11/2000 Castles et al.
6,185,427 B1 2/2001 Krasner et al.
6,208,290 B1 3/2001 Krasner
6,215,442 B1 4/2001 Sheynblat et al.
6,230,018 B1 5/2001 Watters et al.
6,236,365 B1 5/2001 LeBlanc et al.
6,236,635 B1 5/2001 Miyamoto et al.
6,249,252 B1 6/2001 Dupray
6,271,788 B1 8/2001 Longaker et al.
6,275,707 B1 8/2001 Reed et al.
6,353,412 B1 3/2002 Soliman
6,389,291 B1 5/2002 Pande et al.
6,414,635 B1 7/2002 Stewart et al.
6,420,999 B1 7/2002 Vayanos
6,430,415 B1 8/2002 Agashe et al.
6,445,927 B1 9/2002 King et al.
6,466,938 B1 10/2002 Goldberg
6,593,863 B2 7/2003 Pitio
6,597,916 B2 7/2003 Edge
6,650,288 B1 11/2003 Pitt et al.
6,677,894 B2 1/2004 Sheynblat et al.
6,677,895 B1 1/2004 Holt
6,704,574 B2 3/2004 Lin
6,754,488 B1 6/2004 Won et al.
6,757,545 B2 6/2004 Nowak et al.
6,799,047 B1 9/2004 Bahl et al.
6,801,778 B2 10/2004 Koorapaty et al.
6,865,395 B2 * 3/2005 Riley ..... 455/456.1
6,888,811 B2 5/2005 Eaton
6,937,867 B2 8/2005 Oda et al.
6,941,145 B2 9/2005 Ogino et al.
6,956,527 B2 10/2005 Rogers
6,973,320 B2 12/2005 Brown et al.
6,990,428 B1 1/2006 Kaiser et al.
7,006,838 B2 2/2006 Diener et al.
7,039,418 B2 5/2006 Amerga et al.
7,047,022 B2 5/2006 Aoyama
7,054,627 B1 5/2006 Hillman
7,057,557 B2 6/2006 Lee
7,068,999 B2 6/2006 Ballai
7,069,024 B2 6/2006 Sharony
7,082,311 B2 7/2006 Hefner et al.
7,127,257 B2 10/2006 Riley et al.
7,139,580 B2 11/2006 Stein et al.
7,142,848 B2 11/2006 Owen et al.
7,149,531 B2 12/2006 Misikangas
7,158,798 B2 1/2007 Lee et al.
7,203,503 B2 4/2007 Cedervall et al.
7,206,585 B2 4/2007 Gilham et al.
7,215,281 B2 5/2007 Tekinay et al.
7,224,982 B2 5/2007 Ormson
7,224,983 B2 5/2007 Budka et al.
7,248,858 B2 7/2007 Barber et al.
7,251,493 B2 7/2007 Camp, Jr. et al.
7,257,411 B2 8/2007 Gwon et al.
7,257,413 B2 8/2007 Sheynblat
7,280,505 B2 10/2007 Chaskar et al.
7,295,808 B2 * 11/2007 Soliman ..... 455/13.1
7,319,878 B2 1/2008 Sheynblat et al.
7,369,859 B2 5/2008 Gallagher
7,522,588 B2 4/2009 Biacs et al.
7,706,813 B2 4/2010 Shim
7,778,639 B2 8/2010 Shim
7,873,375 B2 1/2011 Annunziato et al.
8,068,056 B2 11/2011 Wachter et al.
2002/0080759 A1 6/2002 Harrington et al.
2002/0116368 A1 8/2002 Matsumoto
2002/0137526 A1 9/2002 Shinohara
2002/0168989 A1 11/2002 Dooley et al.
2002/0199196 A1 12/2002 Rabinowitz et al.
2003/0006931 A1 1/2003 Mages
2003/0008663 A1 1/2003 Stein et al.
2003/0008664 A1 1/2003 Stein et al.
2003/0022675 A1 1/2003 Mergler
2003/0026225 A1 2/2003 Ogino et al.
2003/0040323 A1 2/2003 Pihl et al.
2003/0096622 A1 5/2003 Moilanen
2003/0125044 A1 7/2003 Deloach et al.
2003/0125046 A1 7/2003 Riley et al.
2003/0144006 A1 * 7/2003 Johansson et al. ..... 455/456
2003/0157943 A1 8/2003 Sabat, Jr.
2003/0176196 A1 9/2003 Hall et al.
2003/0210142 A1 11/2003 Freathy et al.
2003/0220105 A1 11/2003 Daigremont et al.
2003/0235172 A1 12/2003 Wood
2004/0002346 A1 1/2004 Santhoff
2004/0043765 A1 3/2004 Tolhurst
2004/0127229 A1 7/2004 Ishii
2004/0162090 A1 8/2004 Suryanarayana et al.
2004/0203567 A1 10/2004 Berger
2004/0203926 A1 10/2004 Ruutu et al.
2004/0258012 A1 * 12/2004 Ishii ..... 370/328
2004/0259546 A1 12/2004 Balachandran et al.
2005/0004527 A1 1/2005 Prescott
2005/0014497 A1 1/2005 Goren
2005/0020309 A1 1/2005 Moeglein et al.
2005/0037775 A1 2/2005 Moeglein et al.
2005/0043038 A1 2/2005 Maanoja et al.
2005/0062643 A1 3/2005 Pande et al.
2005/0064877 A1 3/2005 Gum et al.
2005/0090266 A1 4/2005 Sheynblat
2005/0124355 A1 6/2005 Cromer et al.
2005/0125493 A1 6/2005 Chaskar et al.
2005/0153687 A1 7/2005 Niemenmaa et al.
2005/0181805 A1 * 8/2005 Gallagher ..... 455/456.1
2005/0191991 A1 * 9/2005 Owen et al. ..... 455/411
2005/0197137 A1 * 9/2005 Radic et al. ..... 455/456.1
2005/0227689 A1 * 10/2005 Jewett ..... 455/433
2005/0227705 A1 10/2005 Rousu et al.
2005/0227707 A1 10/2005 Law et al.
2005/0232189 A1 10/2005 Loushine
2005/0246334 A1 11/2005 Tao et al.
2005/0250516 A1 11/2005 Shim
2006/0245406 A1 11/2006 Shim
2007/0001867 A1 1/2007 Rowe et al.
2007/0002813 A1 1/2007 Tenny et al.
2007/0037586 A1 2/2007 Kim et al.
2007/0121560 A1 5/2007 Edge
2007/0140163 A1 6/2007 Meier et al.
2007/0270168 A1 11/2007 Sheynblat
2008/0123608 A1 5/2008 Edge et al.
2008/0280624 A1 11/2008 Wrappe
2009/0104904 A1 4/2009 Shim
2009/0143076 A1 6/2009 Wachter et al.
2012/0115508 A1 5/2012 Moeglein et al.
2013/0095850 A1 4/2013 Sheynblat
2015/0018009 A1 1/2015 Moeglein et al.
2015/0057018 A1 2/2015 Moeglein et al.

FOREIGN PATENT DOCUMENTS

CN 1373371 A 10/2002
CN 1413058 4/2003
DE 10142954 4/2003
EP 0933961 A2 8/1999
EP 1215928 A2 6/2002
EP 1289320 A1 3/2003
EP 1387590 A2 2/2004

(56) References Cited

FOREIGN PATENT DOCUMENTS

| | | | |
|---|---|---|---|
| JP | 6148308 | A | 5/1994 |
| JP | 10213644 | | 8/1998 |
| JP | 2000156881 | | 6/2000 |
| JP | 2001500256 | | 1/2001 |
| JP | 2001305210 | | 10/2001 |
| JP | 2001333184 | | 11/2001 |
| JP | 2002077965 | | 3/2002 |
| JP | 2002510893 | | 4/2002 |
| JP | 2002195846 | A | 7/2002 |
| JP | 2002236163 | A | 8/2002 |
| JP | 2002246976 | A | 8/2002 |
| JP | 2003014488 | A | 1/2003 |
| JP | 2003023384 | A | 1/2003 |
| JP | 2003047045 | | 2/2003 |
| JP | 2003152633 | | 5/2003 |
| JP | 2003520532 | A | 7/2003 |
| JP | 2003319443 | | 11/2003 |
| JP | 2004040775 | | 2/2004 |
| JP | 2004086349 | A | 3/2004 |
| JP | 2004129026 | A | 4/2004 |
| JP | 2005195429 | | 7/2005 |
| JP | 2005525003 | A | 8/2005 |
| JP | 2005525016 | | 8/2005 |
| JP | 2005536944 | A | 12/2005 |
| JP | 2006504284 | A | 2/2006 |
| JP | 2007518979 | T | 7/2007 |
| JP | 2007520915 | A | 7/2007 |
| JP | 2007525093 | | 8/2007 |
| JP | 459109 | | 5/2010 |
| JP | 2011019226 | | 1/2011 |
| KR | 19980702271 | | 7/1998 |
| KR | 19990047966 | | 7/1999 |
| KR | 20000022270 | A | 4/2000 |
| KR | 20010071208 | | 7/2001 |
| KR | 20010087969 | A | 9/2001 |
| KR | 20020073167 | | 9/2002 |
| KR | 20030011866 | | 2/2003 |
| KR | 20030052838 | A | 6/2003 |
| KR | 20030079972 | | 10/2003 |
| KR | 20050098901 | | 10/2005 |
| RU | 2001531 | C1 | 10/1993 |
| RU | 2163053 | C2 | 2/2001 |
| WO | WO9307684 | A1 | 4/1993 |
| WO | WO9810306 | A1 | 3/1998 |
| WO | WO9957576 | | 11/1999 |
| WO | WO0027143 | A1 | 5/2000 |
| WO | WO-0133302 | A2 | 5/2001 |
| WO | WO-0154422 | A2 | 7/2001 |
| WO | WO0221873 | A1 | 3/2002 |
| WO | WO-0223215 | A1 | 3/2002 |
| WO | WO-0246788 | A2 | 6/2002 |
| WO | 02071781 | A1 | 9/2002 |
| WO | WO02079797 | A1 | 10/2002 |
| WO | WO03010552 | A2 | 2/2003 |
| WO | WO-03021286 | A2 | 3/2003 |
| WO | WO2003021851 | A2 | 3/2003 |
| WO | WO03038466 | | 5/2003 |
| WO | WO03058985 | | 7/2003 |
| WO | WO03058986 | A2 | 7/2003 |
| WO | WO-03065740 | A2 | 8/2003 |
| WO | 03094564 | A1 | 11/2003 |
| WO | WO03094285 | A2 | 11/2003 |
| WO | WO2004017092 | A1 | 2/2004 |
| WO | WO2004019559 | | 3/2004 |
| WO | WO2004032561 | | 4/2004 |
| WO | WO2004045110 | | 5/2004 |
| WO | WO2004106964 | | 12/2004 |
| WO | WO2005004527 | | 1/2005 |
| WO | WO2005004528 | | 1/2005 |
| WO | WO2005004528 | A1 | 1/2005 |
| WO | WO2005027393 | | 3/2005 |
| WO | WO2005029120 | | 3/2005 |
| WO | 2005046254 | A2 | 5/2005 |
| WO | 2005065320 | A2 | 7/2005 |
| WO | WO2005089384 | | 9/2005 |
| WO | WO2006029277 | A1 | 3/2006 |
| WO | WO-2007056738 | A2 | 5/2007 |

OTHER PUBLICATIONS

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1). (146 pages).

3rd Generation Partnership Project 2 "3GPP2", Internet Article, Version 1.0 (Online), Oct. 2005, Section 4 (6 pages).

3rd Generation Partnership Project 2 "3GPP2": "cdma2000 Packet Data Services; Wireless Local Area Network (WLAN) Inter-working," 3GPP2 X.S0028-000-0, Version 1.0, pp. 1-119 (Jul. 2006).

3rd Generation Partnership Project 2 "3GPP2": "TIA/EIA-41-D Location Services Enhancements," 3GPP2 X.S0002. Version 1.0.0. pp. 1-234 (Mar. 2004).

3rd Generation Partnership Project; Technical Specificatiln Group GSM/EDGE Radio Access Network, "Generic access to A/Gb interface; Stage 2 (Release 6)," 3GPP TS 43.318 V6.8.0, pp. 1-71 (Nov. 2006).

3rd Generation Partnership Project; Technical Specification Group GSM/EDGE Radio Access Network, "Functional stage 2 description of Location Services (LCS) in GERAN (Release 4)," 3GPP TS 43.059 V4.7.0, pp. 1-50 (Apr. 2006).

3rd Generation Partnership Project; Technical Specification Group Services and System Aspects, "3GPP system to Wireless Local Area Network (WLAN) interworking; System description (Release 6)." 3GPP TS 23.234 V6.10.0, pp. 1-75 (Sep. 2006).

3rd Generation Partnership Project; Technical Specification Group Services and System Aspects, "Functional stage 2 description of Location Services (LCS)(Release 7)," 3GPP TS 23.271 V7.6.0, pp. 1-141 (Sep. 2006).

Anonymous: "Position Determination Service for cdma2000(R) Spread Spectrum Systems;(Revision of TIA/EIA/IS-801) ;TIA-801-A" 19000101, Apr. 2004 (Apr. 2004), XP017004816 p. 2.5-p. 2.6.

International Search Report and Written Opinion—PCT/US05/022090, International Search Authority—European Patent Office—Feb. 28, 2007.

Joint Standard, "Enhanced Wireless 9-1-1 Phase II (Erratum)," J-STD-036-B, pp. 1-344 (Jun. 2006).

Open Mobile Alliance, "Secure User Plane Location Architecture," Candidate Version 1.0, pp. 1-80 (Sep. 2006).

Universal Mobile Telecommunications System (UMTS); Radio Resource Control (RRC); Protocol specification (3GPP TS 25.331 version 5.18.0 Release 5) ETSI TS 125 331 V5.18.0, pp. 1-1047 (Sep. 2006).

Supplementary European Search Report—EP05858513—Search Authority—The Hague—Feb. 21, 2011.

Translation of Office Action in Korean application 10-2005-7024968 corresponding to U.S. Appl. No. 10/877,205, citing US6236365 and KR20010071208 dated Jan. 17, 2011.

Translation of Office Action in Korean application 2010-7013139 corresponding to U.S. Appl. No. 11/557,451, citing KR20050098901 and US20050153687 dated Feb. 24, 2011.

Orville, "Development of the National Lightning Detection Network," BAMS, Feb. 2008, 11 pages.

Kikuchi T, "What's New, Not Worse Than Wired, Nikkei Electronics," Japan, Nikkei Business Publications, Inc., Mar. 31, 2003, No. 844, pp. 30-31.

Suzuki Y, "Technologies of Internet Access Communication," Information Processing, Japan, The Information Processing Society of Japan, Apr. 2002, vol. 43, No. 4, pp. 462-467.

* cited by examiner

METHOD AND APPARATUS FOR DETERMINING LOCATION OF A BASE STATION USING A PLURALITY OF MOBILE STATIONS IN A WIRELESS MOBILE NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This applications claims priority to U.S. Provisional Application No. 60/580,929, filed on Jun. 18, 2004.

BACKGROUND

1. Field

The present invention generally relates to wireless communications systems in which a base station communicates with a number of mobile stations that have position location capabilities, and more particularly to the determination of the position of a base station in a mobile communication network.

2. Description of Related Art

In wireless communication networks, one or more base stations communicate wirelessly with a number of mobile stations (e.g., wireless devices such as cell phones). Mobile stations usually provide standard voice and/or data communication; as an additional feature, some mobile stations have positioning capabilities, which allow the user of the mobile station to determine his or her position. Such position determination capabilities are becoming increasingly useful and important; for example, the regulatory requirements of a jurisdiction may require a network operator to report the location of a mobile station when the mobile station places a call to an emergency service, such as a 911 call in the United States. Or a user may simply want to know his or her position for purposes of locating a nearby restaurant or movie theater.

One well-known type of position location system utilizes satellites in earth orbit to trilaterate a position of the mobile station. One example of such a system is the Global Positioning Satellite (GPS) system currently in operation. Another type of position location system utilizes radio signals from base stations whose locations are known. For example, in one communication network—a Code Division Multiple Access (CDMA) digital cellular network—the position location capability can be provided by Advanced Forward Link Trilateration (AFLT), a technique that computes the location of the mobile station (MS) from the mobile station's measured time of arrival of radio signals from the cellular base stations. An AFLT-enabled wireless mobile station makes pilot phase measurements (PPMs) of the radio signals from the base stations with which it is communicating, and uses these measurements to determine the mobile station's position. A more advanced technique is hybrid position location, where the mobile station also employs a GPS receiver and the position is computed based on both AFLT and GPS measurements.

Message protocols and formats for CDMA position location employing AFLT, GPS, and hybrid receivers, applicable to both the MS-based and MS-assisted cases, have been published in TIA/EIA standard IS-801-1 2001, Position Determination Service Standard for Dual-Mode Spread Spectrum Systems-Addendum. Pages 4-41 through 4-44 of this standard specify that each base station shall transmit a base station almanac message among other elements containing the locations of the base station antennae transmitting the CDMA pilot pseudorandom (PN) sequence.

Thus, in wireless communication systems with AFLT capabilities, the wireless base stations can be used as reference points to assist in fixing the location of a mobile station. However, one prerequisite to using a base station as a reference is precise knowledge of the position of the base station antennae. Timing information regarding the base station is also important. Once known, the base station's antenna position and timing information may be recorded in a base station almanac (BSA) database for use by a position determining entity (PDE). However, acquiring the base station's antenna precise location and timing information can be tedious and expensive.

To further elaborate on the position determination system, data concerning calibration or re-calibration of a base station time offset, base station antenna location and other parameters are typically stored in what is called a "base station almanac." The base station almanac database provides information for determining an initial position estimate of the mobile station to seed GPS pseudorange searching. Due to PN reuse, the base station almanac database provides information for resolving ambiguities about which observed pseudorandom noise sequences (PNs) correspond to which physical sectors of a CDMA network base station. The base station almanac database provides the cellular base station sector antenna position from which signals emerge. AFLT range measurements are made to these antenna positions.

In some instances the position of a base station antenna may change slightly or by a larger distance, and in that instance the corresponding almanac information must be updated. For example a base station antenna may be relocated, or a base station transceiver may be repaired or replaced, a new cable may be placed between a transceiver and an antenna causing a change in the base station antenna position or timing information. In another example, a base station can be logically (but not physically) moved, when, for example, two physical base stations swap their identification information, and in such a circumstance, the two stations would appear to have swapped locations although neither base station physically moves.

In such situations, if not updated, the corresponding information in the database can become erroneous; therefore the almanac database must be updated before resuming service from the base station. However, updating the almanac database using conventional techniques can be time-consuming and expensive: for example conventionally the antenna location may be determined by a survey or with reference to coordinates read from a map, and if the antenna coordinates are entered manually into the database then the possibility of human error arises. The base station timing information is also subject to human error in cases where custom hardware is used to measure the timing information, and timing offsets are entered manually into the database.

In Local Area Networks the significant number of base stations (several million), the deployment practices and the ease of moving the portable base station from one physical location to another make it impossible to locate and maintain the base station almanac using conventional surveying techniques.

In summary, deployment of base station time difference of arrival ranging solutions such as AFLT or hybrid-AFLT requires accurate base station almanac (BSA) information including base station antennae locations and forward link calibration parameters such as time corrections, which are key components of the BSA information. Today, population of the BSA parameters is done individually for each base station, which is a manual, laborious and expensive process, and therefore hinders the deployment and proliferation of LBS services. It would be an advantage to provide a practical system that can update the BSA parameters in real time using data from mobile devices that are in the area to compute base station locations and forward link calibration parameters.

SUMMARY

A method and apparatus for determining a position of a base station in a wireless communication network that includes a plurality of mobile stations in communication with one or more base stations is disclosed. The method comprises programming a group of mobile stations with a BTS calibration program, thereby providing a plurality of calibration-enabled mobile stations, and providing a BTS calibration server networked with the base station. Calibration information is requested from at least one of the calibration-enabled mobile stations in communication with a base station, and the position of the calibration-enabled mobile station(s) is determined. A signal from the base station is received at the mobile station(s), and this signal may be used to measure the time of travel of the signal from the base station to the mobile station, for example it may measure path delays of the signals transmitted between the base station and the mobile stations to determine distances between the base station and the mobile stations, and may include measuring a relative time of arrival in a TDOA system, or a round trip delay in an RTD system. If authorized, calibration information indicative of the position is transmitted from the mobile station(s) to the BTS calibration server. In the BTS calibration server, the calibration information is compared with base station almanac information associated with the base station, and the position and timing of the base station may be calibrated responsive thereto.

In order to provide the user of the mobile station a way to prevent it from being used for base station location, the mobile station calibration software may determine if it is authorized to communicate calibration information. If there is no authorization then operation is exited any time before transmitting calibration information, otherwise operation is completed. For example, the users of the calibration-enabled mobile phones may utilize the BTS calibration program to create privacy settings to indicate authorization to provide calibration information, and the step of determining if the mobile station is authorized to communicate calibration information further comprises checking the privacy settings to verify that the mobile station is authorized to provide calibration information.

Calibration information may be requested by the BTS calibration server, or by the mobile station, triggered upon a particular event. For example, the calibration request may be initiated by the BTS calibration software when in communication with the target base station. As another example, the BTSCS may select a target base station, and the BTS calibration server requests calibration information from at least one of the software-enabled mobile stations in communication with the target base station. In yet another example, the BTSCS may provide the identity of a target base station to the mobile stations for the BTS calibration software processing.

The position of the mobile stations is determined by any suitable method. For example if the mobile stations have global satellite receivers, the positions of the mobile stations may be determined from signals received by the mobile stations from global satellites. Alternatively, or in addition to GPS, the positions of the mobile stations may be determined by Advanced Forward Link Trilateration (AFLT) of each mobile station from base stations having accurately known positions. The mobile stations may comprise hybrid telephone handsets including global satellite receivers, the positions of the mobile stations may be determined from signals received by the mobile stations from global satellites, and the position of the base station may be determined from the positions of the mobile stations using time difference of arrival, time of arrival or round trip delay systems.

A variety of embodiments are disclosed. The mobile stations may comprise hybrid telephone handsets including global satellite receivers. The positions of the mobile stations may be determined from signals received by the mobile stations from global satellites, and/or the base stations comprise at least one Wireless LAN base station, and/or the position of the Wireless LAN base station (such as a WiFi access point) may be determined from the positions of the mobile stations in communication with the Wireless LAN base station, using Wireless LAN signals.

BRIEF DESCRIPTION OF THE DRAWINGS

For a more complete understanding, reference is now made to the following detailed description of the embodiments as illustrated in the accompanying drawing, wherein.

DETAILED DESCRIPTION

Figure 1:
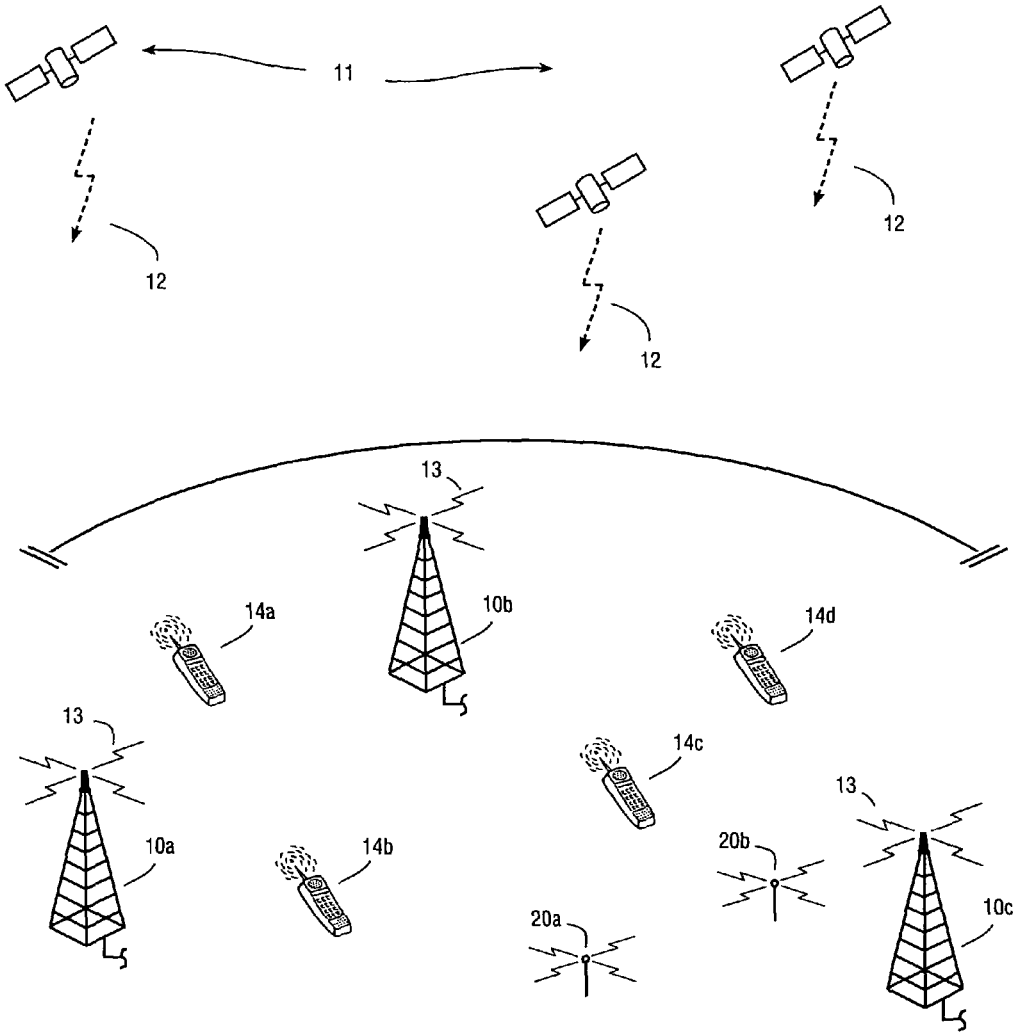
FIG. 1 is a perspective view of a plurality of cellular base stations, GPS satellites, and a user holding a wireless mobile device such as a cell phone.
Figure 1:
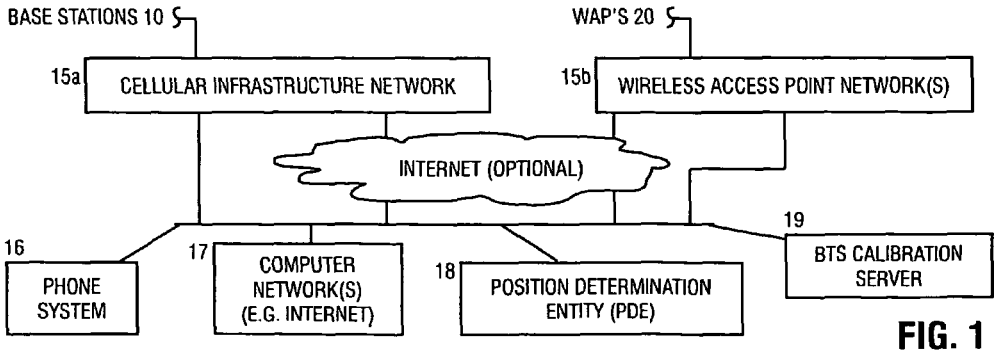

In the drawing, like numbers are used to denote like or similar elements.

Glossary of Terms and Acronyms

The following terms and acronyms are used in the detailed description:

AFLT (Advanced Forward Link Trilateration): a technique, implemented in CDMA systems, that computes the location of a mobile station (MS) from the mobile station's measured time difference of arrival of radio signals from the base stations.

BSA (Base Station Almanac): An almanac that includes location information and time correction information, among other information, for one or more base stations.

BSA message: The BSA message (e.g., the Provide Base Station Almanac message of the IS-801-1 protocol) includes fields that describe a BTS including its location and time correction values, among other information. The BSA message is typically sent to an MS upon request by the MS.

BTS (Base Station Transceiver Subsystem): (a/k/a base station or cell site): A fixed-position station that includes a transmitter and receiver (transceiver) for communicating with mobile stations. Includes antennas for transmitting and receiving wireless communication signals from mobile stations.

BTSCS (BTS Calibration Server) A server connected to the network of base stations (BTS's). The BTSCS provides services related to calibration of base station location and timing using one or more mobile phones in communication with the base station.

CDMA (Code Division Multiple Access): a high-capacity digital wireless technology that was pioneered and commercially developed by QUALCOMM™ Incorporated.

Calibration-enabled Mobile Station: a mobile station that has an installed, operating BTS calibration program.

Cellular: A type of communication service in which an MS communicates with one or more base stations in a cellular network, each in a different Wireless Wide Area Network or Wireless Local Area Network "cell" that covers a relatively small area. As the MS moves from one cell to another, there is a "handoff" from cell to cell. "Cellular" is used herein in its broadest sense to include at least digital and/or analog systems.

GPS fix: the end result of a process of satellite measurements and subsequent computations by which the location of the MS (GPS user) is determined.

GPS (Global Positioning System): Although the term GPS is often used to refer to the U.S. Global Positioning System, the meaning of this term includes other satellite-based global positioning systems, such as the Russian Glonass System and the planned European Galileo System.

GSM (Global System for Mobile): a widely-used digital wireless communication technology.

MS (Mobile Station) a portable electronic device such as a cell phone, PDA or a laptop that has a means (such as a modem) for communicating with one or more base stations. Sometimes referred as a mobile handheld unit, portables, mobiles, handhelds, personal stations, wireless devices, subscriber units, mobile terminals, or user terminals, for example. MS's referenced in this disclosure have position determining capabilities.

MTSO (Mobile Telephone Switching Office): Provides control and commands to the mobile stations. Also provides connectivity to the PSTN.

PDE (Position Determination Entity): A system resource (e.g., a server) typically within the CDMA network, working in conjunction with one or more GPS reference receivers, which is capable of exchanging location information with an MS. For example, in an MS-Assisted A-GPS session, the PDE can send GPS and/or cellular assistance data to the MS to enhance the satellite and base station pseudorange signal acquisition process. The MS returns pseudorange measurements back to the PDE, which is then capable of computing the position of the MS. Alternatively, in an MS-Based A-GPS session, the MS sends back computed position results to the PDE. The PDE can also provide assistance data regarding other networked entities, such as the identifying information, position information and type of wireless base stations (access points) that may be in the vicinity of the MS.

PSTN (Public Switched Telephone Network): Provides connection to wireline telephones in homes and businesses, for example.

RSSI (Received Signal Strength Indicator): A parameter indicating strength of a wireless signal between a base station and a mobile station.

RTD (Round Trip Delay): A method of measuring distance by measuring a two-way travel time (distance) between a base station and a mobile station, e.g., a base station sends a signal to a mobile station, which is returned to the base station, and the base station then measures the time between transmitting the signal and receiving the return signal, which can then be divided by two to provide an indication of the distance between the base station and the mobile station. Alternatively, the RTD can be measured by the mobile station.

QoS (Quality of Service): A measure of a desired service parameter such as the accuracy of position location information.

SV (Satellite Vehicle): One major element of the Global Positioning System is the set of SVs orbiting the Earth, broadcasting uniquely identifiable signals.

TDOA (Time Difference of Arrival): A system that measures distance by measuring the relative times of arrival of radio signals from the base stations; e.g., for example, in CDMA networks AFLT systems use TDOA to provide PPM measurements, the time difference of arrival is indicated by a pilot phase measurement that is relative to the reference pilot used to set the mobile station's time base. Another example of a TDOA system is an Uplink TDOA system, which uses the time difference between transmission of a mobile station signal and reception by base stations.

TOA (Time of Arrival): A system which measures the time of arrival of a one-way signal; e.g., for example, a GPS system which measures the time of arrival of a satellite signal.

WLAN (Wireless Local Area Network): a limited-range wireless communication network; examples include WiFi, WiMAX, Bluetooth, etc.

Use of Mobile Stations to Determine Base Station Location

U.S. Patent Publication US2003/0125046 A1 published Jul. 3, 2003, entitled "Use of Mobile Stations for Determination of Base Station Location Parameters in a Wireless Mobile Communication System", discloses a system in which a network uses known positions of one or more mobile stations to verify, update, and/or determine the position of a base station, and is assigned to the same assignee as the present application. For example, the publication discloses a method for AFLT-enabled wireless handsets to provide pilot phase measurements (PPMs) to a network, which can be used to determine the base station locations and associated forward link calibration parameters. As an example, to solve for a base station location an algorithm would require a PPM to said base stations measured by at least three distinct geographically separated mobiles each one at a known location; the knowledge of the mobile station location can be ascertained via GPS. One alternative is to manually survey base station antennae and use GPS fix to compute errors to the PPM measurements by collecting measurements with a dedicated base station calibration handset in the field in close proximity to the base station.

Particularly, the system disclosed in Publication US2003/0125046 A1 describes methods that use the mobile stations in communication with a base station to determine the location parameters of that base station. For example, the positions of the mobile stations are determined, and then the position of the base station is determined from the positions of the mobile stations and from signals transmitted between the base station and the mobile stations. Despite erroneous base station location parameters for at least one of the base stations, it is often possible to accurately determine the positions of the mobile stations from the base station location parameters of other base stations, or from global satellite signals received by the mobile stations if the mobile stations are equipped with global satellite receivers.

In addition, the base station location information in the database can be checked during normal position location sessions whenever the position of a mobile station is determined independent of the location of a base station in communication with the mobile station. This is done by determining the distance between the base station and the mobile station from signals transmitted between the base station and the mobile station. When this distance is inconsistent with the base station location information in the database, the database may be modified to include corrected base station location information. In this fashion, it is possible to find erroneous base station information and discontinue its use for position location services before the correct location of the base station becomes known.

Erroneous base station location information can be corrected automatically once a sufficient number of independent distances are determined between the base station and mobile stations having known positions. With a sufficient number of independent distance measurements, it is possible to determine the base station location with a degree of certainty comparable to the position of a single mobile station. In this fashion, it is possible to automatically maintain and improve the base station location information in the database. This can be done while providing regular position location services, without any change in the communication protocols between the base stations and the mobile stations.

What is needed is a practical system and apparatus that would bring these base station location concepts into wide use while at the same time making the solution economically viable.

Overview

The position location system described herein utilizes information from calibration-enabled mobile stations to determine the position of a base station, and update the base station almanac on an ongoing basis. This system is useful for a number of reasons: for example handset-based information can be utilized to shorten time to commercial service of new base stations and provide ongoing improvement in location performance. Advantageously, the system can be implemented with no hardware modification, and very little modification to the basic subscriber service elements; thus very little cost is required to provide this network preparation and improvement ability.

Each handset that is part of the system utilizes a calibration program to communicate with, and respond to a calibration server. The calibration program can for example, be BREW-, Java- or similar technology-based, and can be downloaded or embedded in the handset.

In one example, in a CDMA system, in order to calibrate or re-calibrate the base station, GPS and AFLT position measurement data is obtained from mobile stations during regular position location sessions for example when mobile station users normally engage in telephone calls, or when field service personnel drive around to selected locations and place calls for the purpose of obtaining position measurement data not otherwise obtained from the regular position location sessions, and then sent to the BTSCS. In this fashion, the BTSCS may then use this information to compute the calibration data internally and store the calibration data in the base station almanac database on a continuous basis. In addition, to alleviate any privacy concerns, the regular position location sessions may occur only when the user of the location-enabled mobile station places or answers a wireless telephone call. In this case, the CDMA system does not determine the user's position without the user's knowledge and consent. In another example, the user of the mobile station (cellular phone) authorizes the use of the mobile station as a calibration device, allowing the BTSCS to request calibration information from such device.

Description

FIG. 1 is a perspective view of a wireless communication network 10 that includes a plurality of wide area network base stations 10 including first, second, and third base stations 10a, 10b, and 10c respectively, a plurality of local area network base stations (access points) 20 including first and second base stations 20a 20b respectively, GPS satellites shown collectively at 11, and a plurality of mobile stations 14 including first, second, third, and fourth mobile stations 14a, 14b, 14c, and 14d respectively. FIG. 1 is provided for illustrative purposes; it should be clear that in an actual implementation additional (or fewer) base stations and MS's may be in operation at any one time.

In one embodiment, the satellites (SV's) 11 comprise any group of satellites utilized for positioning a satellite receiver. In the GPS system, the satellites send out wireless GPS signals 12 synchronized to GPS system time, generated at a predetermined frequency, and in a predetermined format. A GPS reference receiver may be physically located in any of the base stations 10, which can communicate with the PDE 18 to provide useful information in determining position using the satellites, such as a GPS satellite navigation data, differential corrections and GPS system time.

The MS may be in the form of an electronic device held by a user (not shown); for example the user may be on foot as shown, or may be traveling in a car or on public transportation. Each MS 14 (as described in more detail with reference to FIG. 3) includes a position location system 34. The position location system may include a GPS system that utilizes the GPS signals to determine the position of the MS and/or it may include an AFLT system. The MS also includes a two-way communication system 32 such as a cell phone receiver that utilizes two-way communication signals 13 to communicate with the cellular base stations 10. As an alternative, or in addition to the cellular communication system, the communication system in the MS may include another wireless communication system, such as WiFi, WiMAX, or Bluetooth, that utilizes communication signals to communicate with the access points 20 of the Wireless Local Area Network such as an 802.11 network.

Generally, the cellular base stations 10 comprise any group of cellular base stations utilized as part of a wireless communication network that communicates with the MS's using wireless signals 13. In the example of FIG. 1, the cellular base stations are networked to a cellular infrastructure network 15a, which is in turn networked to other communication networks and network entities by any suitable network protocol, such as TCP/IP over the internet as shown optionally, or SS7 as shown in a direct connection, for example. Thus, the cellular infrastructure network 15a provides communication services between the base stations and a plurality of other communication networks such as a public phone system 16, computer networks 17, and any of a variety of other entities and communication systems. The networks and network entities may be connected by hardwired connections or by any other suitable connections for transferring data.

The ground-based cellular infrastructure network 15 typically provides communication services that allow the user of a cell phone to connect to another phone using the phone system 16; however the cellular base stations could also be utilized to communicate with other devices and/or for other communication purposes, such as an internet connection with a handheld personal digital assistant (PDA) or a laptop computer. In one embodiment, the cellular base stations 10 are part of a CDMA communication network; however in other embodiments the cellular base stations may utilize other types of access technologies (e.g., GSM, WCDMA, TDMA, OFDM, etc.).

In addition to the cellular base stations 10a, 10b, and 10c, other types of base stations such as wireless access points may be implemented using any suitable protocol, for example WiFi, WiMAX, and Bluetooth. As shown in FIG. 1, access points 20a and 20b (referenced collectively as 20) are networked with a network 15b suitable for the particular implementation of wireless access points. Analogous with the cellular infrastructure network 15a, the wireless access point network 15b is networked to other communication networks and entities by any suitable network protocol, such TCP/IP over the internet as shown optionally, or SS7 as shown in a direct connection, for example. Thus, the wireless access point network 15b provides communication services between the wireless access points and a plurality of other communication networks such as a public phone system 16, computer networks 17, and any of a variety of other entities and communication systems. The networks and network entities may be connected by hardwired connections or by any other suitable connections for transferring data.

The network also includes a position determination entity (PDE) 18, shown connected to the cellular infrastructure network 15. For example, for A-GPS methods the PDE comprises a system resource (e.g., a server) typically within the network, working in conjunction with one or more GPS reference receivers on the ground, which is capable of exchanging GPS-related information with an MS. In an MS-Assisted A-GPS session, the PDE can send GPS assistance data to the MS to enhance the satellite signal acquisition process. The MS returns pseudorange measurements back to the PDE, which is then capable of computing the position of the MS. Alternatively, in an MS-Based A-GPS session, the MS sends back computed position results to the PDE. In yet another example, in an autonomous mode, the MS can determine its position without any assistance from the server. In another example, the PDE can be connected to the wireless access point network 20.

Also part of the cellular network is a BTS Calibration Server 19 (BTSCS). The BTSCS is a system resource that is connected to the cellular infrastructure network, and may work in conjunction with the PDE 18, as described herein, or in some embodiments may be implemented partially or wholly within the PDE. The BTSCS provides services related to calibration of base station using one or more mobile stations in communication with one or more base stations, as described herein. In one embodiment, the BTSCS is a dedicated server used for BTS calibration purposes, and is not associated with E-911 services. Similarly, the BTSCS can be part of or connected to the wireless access point network. In such case, the BTSCS supports the calibration of the base stations (access points) of the local area network. In another example, one BTSCS can serve both the cellular and the wireless access points network.

Figure 2:
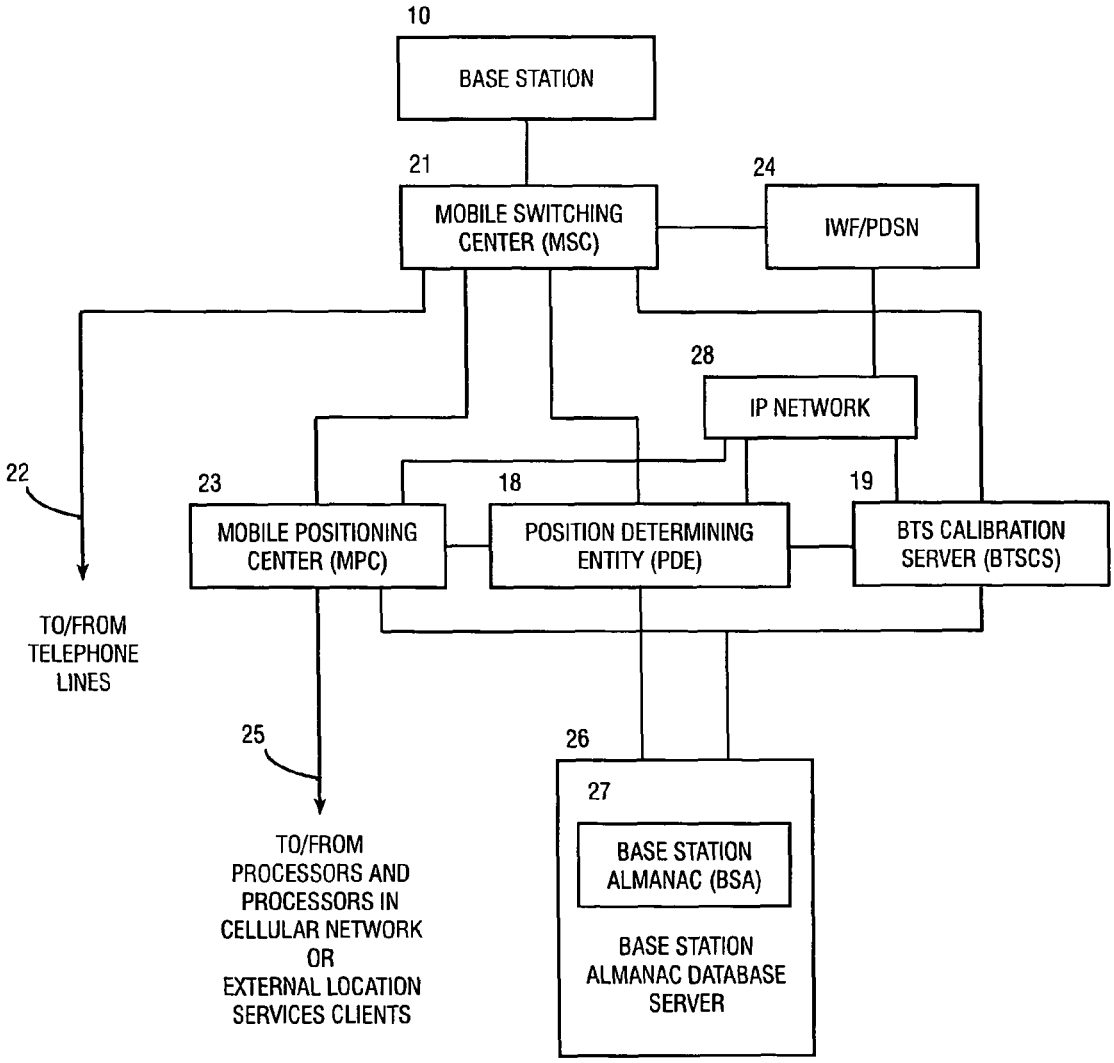
FIG. 2 is a block diagram of one example of the stationary components that reside in the cellular network shown in FIG. 1.

FIG. 2 is a block diagram of one example of the stationary components that reside in the cellular network shown in FIG. 1. A mobile switching center (MSC) 21 performs switching functions (i.e., routing of circuit-switch voice and data) for mobile stations within its coverage area. The mobile switching center (MSC) 21 interfaces voice signals and telecommunication data between base station 10 and a number of telephone lines 22, such as copper wires or optical fibers. A mobile positioning center (MPC) 23 is connected to the mobile switching center (MSC) 21. A packet data serving node (PDSN) 24 and/or interworking function (IWF), connected to the MSC 21, is responsible for the establishment, maintenance, and termination of packet-switch data sessions for mobile stations in the cellular network. The MPC 23 manages position location applications and interfaces location data to external location services clients or external data networks through a data network link 25. In the simplest form, the position determination entity (PDE) 18 collects and formats satellite reference data. The PDE 18 provides wireless assistance to mobile stations and performs position computations in MS-assisted mode. The BTSCS 19 provides services related to calibration of base station location using one or more mobile phones in communication with one or more base stations, as described in more detail herein. The PDE 18 and the BTSCS 19 are connected to the MPC 23 and the MSC 21, and also to the IWF/PDSN 24. In the example of a packet-switched mode, the PDE 18 and the BTSCS 19 are connected to the IWF/PDSN 24 through an IP network 28. The PDE 18 and the BTSCS 19 access a base station almanac database 27 that is managed by a base station almanac data base server 26. The PDE 18, the BTSCS 19, and the base station almanac data base server 26 are implemented, for example, using conventional digital computers or work stations. The base station almanac 27 is stored in any suitable location, such as the hard disk of the computer for the base station almanac data base server 26.

Mobile Station

Figure 3:
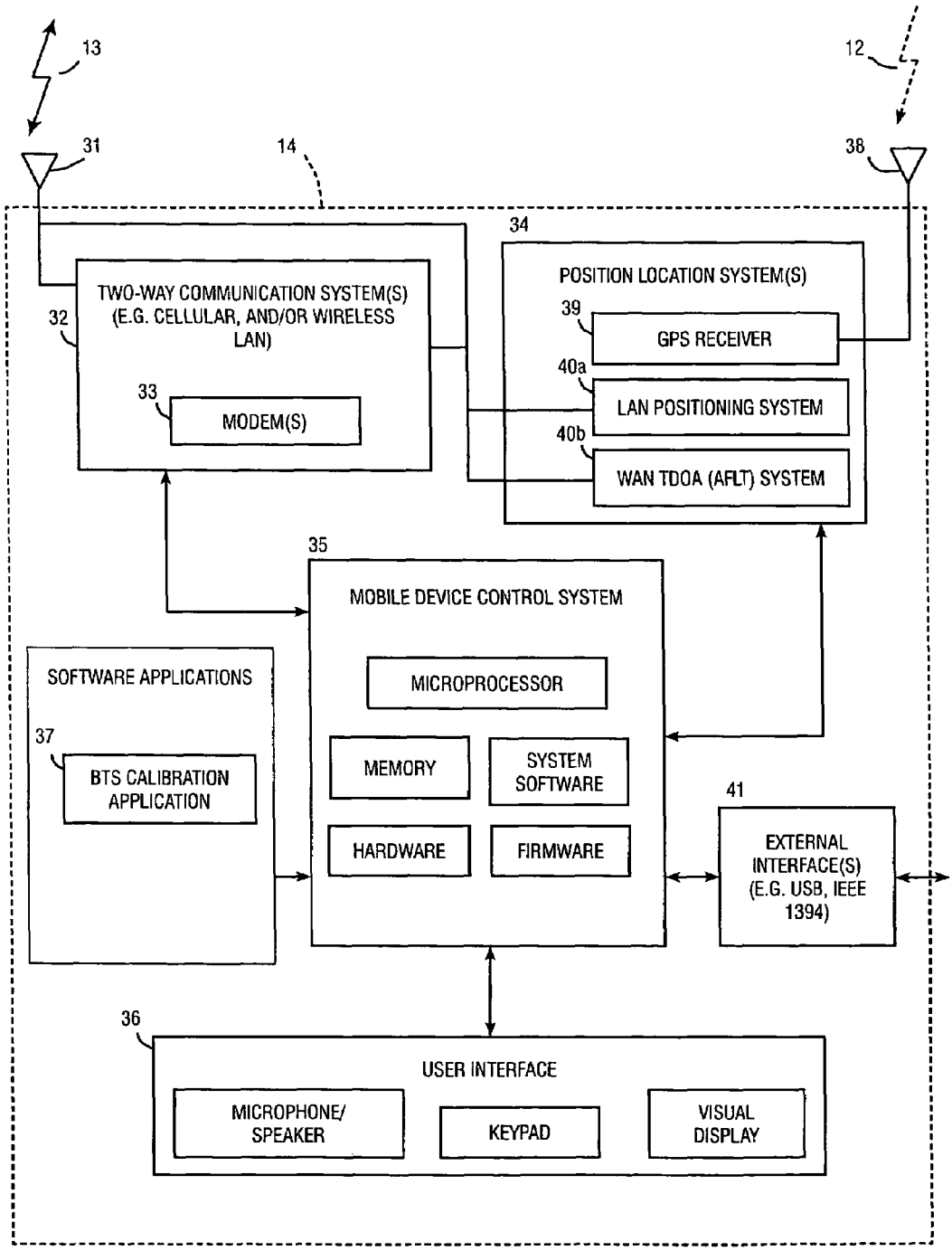
FIG. 3 is a block diagram of one embodiment of the mobile device that incorporates communication and position location systems.

FIG. 3 is a block diagram of one embodiment of the mobile station 14 incorporating communication and position location systems. The main units in this embodiment include one or more two-way communication system(s) 32, position location system(s) 34, an MS control system 35, and a user interface 36. For ease of description, the communication system 32 may be discussed as a single system in the cellular context as an example; it should be apparent that the basic structure would be repeated as appropriate for any other wireless communication system (e.g., WiFi, WiMAX, Bluetooth) that may be implemented in the mobile station. The example shown also does not preclude implementation of multiple wireless communication systems with varying degrees of integration whereby the microprocessors, baseband processors and RF front ends can be shared or integrated on a single chip.

The cellular communication system 32 is connected to a cellular antenna 31 that communicates with the base stations using the two-way wireless signals 13. It is important to note that the wireless signals 13 do not have to be two-way to support positioning. The cellular communication system 32 comprises any suitable devices, such as a modem 33, and other hardware and software for communicating with and/or detecting signals 13 from base stations. The cellular communication system 32 also includes appropriate hardware and software for processing transmitted and received information.

The position location system 34 (FIG. 3) includes any suitable position location system; for example it may include a WAN TDOA system such as AFLT, a satellite position system such as a GPS receiver, or a hybrid GPS/AFLT system. In the hybrid system embodiment shown in FIG. 3, the position location system 34 comprises antennae 31 and 38 to receive cellular signals 13 and GPS signals 12 respectively, a GPS receiver 39, a LAN Positioning system 40a, a WAN TDOA system 40b and any suitable hardware and software for receiving and processing GPS, cellular and wireless LAN signals and for performing any calculations necessary or useful to determine position using any suitable position location algorithm.

GPS Positioning: The mobile station, with the assistance of system resources such as the PDE 18, is also capable of locating the position of the mobile stations using the well-known GPS technique. For example, in a CDMA system each base station 10 may have a GPS receiver receiving the carrier and a pseudorandom code sequence of at least one of the GPS satellites, which provides a system time base referenced to the GPS system time. When a mobile station participates in a position location session with the CDMA network, the serving base station may provide the accurate GPS time reference and send GPS acquisition data to the hybrid mobile station. The mobile station may use the GPS time and the GPS acquisition data to obtain a measurement of the pseudorange between each GPS satellite and the mobile station. In the case of an MS-assisted solution, the mobile station transmits the pseudorange measurements to the serving base station. The PDE may be used to assist the MS to compute the geographic location of the mobile station from three or more of the pseudorange measurements. Alternatively, in the case of an MS-based solution, the geographic location of the mobile station may be calculated by the mobile station itself.

AFLT Positioning: The CDMA network is capable of locating the position of the mobile station 14 using the well-known TDOA (AFLT) technique of the mobile station measuring the relative times of arrival of so-called pilot radio signals from the base stations. The time difference of arrival is indicated by a pilot phase measurement that is relative to the reference pilot used to set the mobile station's time base. In most cases, each difference locates the mobile station on a particular hyperbola. The intersection of the hyperbolas provides the estimate of the location of the mobile station.

Particularly, in one embodiment of an AFLT system, during a position fix, pilot phase measurements are calculated to all base station that can be heard by the handset. Depending on the environment, this is usually at least three or more base stations, and often as many as twenty or more in dense urban environments. Thus each positioning event can result in many relative distance estimates, at least some of which may be useable in the calibration process described herein.

Positioning operations: In order to determine position of the mobile station with assistance form the PDE, the PDE may use any of several methods sequentially or in parallel to calculate the final position, and the approach most likely to achieve the least position error is selected. In one embodiment, a GPS fix is attempted first, because accuracy is expected to be superior to any other method. If the GPS-only fix fails (in one example, GPS fix does not meet the selected QoS), the PDE selects from among several other approaches, and the result with the smallest associated error estimate is used. These other approaches include for example: AFLT-only; an enhanced cell-ID where the position is determined by knowing the sector orientation, received signal strength and the approximate range using an RTD measurement (where available); a "mixed cell sector" fix determined using knowledge of the sectors seen by the mobile, and each sectors' position and orientation; a current serving sector coverage area centroid position determination (or if it was not possible to determine the current serving sector, the original serving sector); the centroid position of the current Network ID/System ID coverage region; and finally a default position stored in the PDE's configuration file. In the example of Wireless Local Area Networks, similar techniques are applicable, whereby the relative and absolute distance measurements, the signal travel times, the signal strength measurements, identification and/or address of the access points and their coverage information can all be used to determine the estimate of the mobile station's position.

Calibration of base station: In TDOA and TOA systems, the base station time base should be calibrated when the base station is installed or modified, or periodically. In a CDMA system, each base station has a respective time offset between the GPS system time and the CDMA system time transmitted with CDMA signals, due to variations in propagation delay or phase shift from the GPS antenna to the GPS receiver, from the GPS receiver to the CDMA transceiver, and from the CDMA transceiver to the CDMA antenna. Therefore, to reduce wireless ranging errors, every base station should be calibrated after the base station installation is complete, for example, by storing a time offset for the base station in the base station almanac data base 27 for use by the PDE 18. It is desirable to re-calibrate the base station and update the database for any subsequent hardware change. Moreover, since the base stations can be moved physically or assigned a different identifier, it can be important to re-calibrate the location information associated with each base station, periodically or even continuously.

Mobile Device Control System: A mobile device control system 35 is connected to both the two-way communication system 32 and the position location system 34. The mobile device control system 35 includes any appropriate structure, such as a microprocessor, memory, other hardware, firmware, and software to provide appropriate control functions for the systems to which it is connected. It should be apparent that the processing steps described herein are implemented in any suitable manner using one or more of hardware, software, and firmware, subject to control by the microprocessor.

The control system 35 is also connected to a user interface 36, which includes any suitable components to interface with the user, such as a keypad, a microphone/speaker for voice communication services, and a display such as a backlit LCD display. The mobile device control system 35 and user interface 36, connected to the position location system 34 and the two-way communication system 32, provide operational functions such as controlling user input/output and displaying results.

The MS 14 may include one or more external interfaces 41 for connection with other devices. For example USB or IEEE 1394 ports may be provided, or wireless ports (e.g., Bluetooth, USB, infrared) may be included for interface and communication with other electronic devices.

Software Applications: A number of software applications may be stored in the MS 14, and connected to the MS control system 35 to be run using the microprocessor and code found therein. The software applications are based upon any suitable platform such as BREW, Java or other technology. The software applications are stored in any suitable memory, for example disk drives, SIM cards, flash memory, RAM, firmware, or read-only memory (ROM).

BTS calibration program 37: A BTS calibration program 37 is included in the software applications. The BTS calibration program includes code suitable to perform the operations described herein (such as with reference to FIGS. 4 and 5), to allow a group of mobile stations to be used for calibration purposes in a controlled fashion. For example, the calibration program 37 may be run in the background without active participation by the user, and without identifying the user. The BTS calibration program resides in any location accessible by the microprocessor; for example, the program may be embedded into firmware or software stored in memory, or may be downloadable from a remote application server connected to the base station, for example. It could also be implemented, at least partially, in hardware such as a computer chip.

Figure 4:
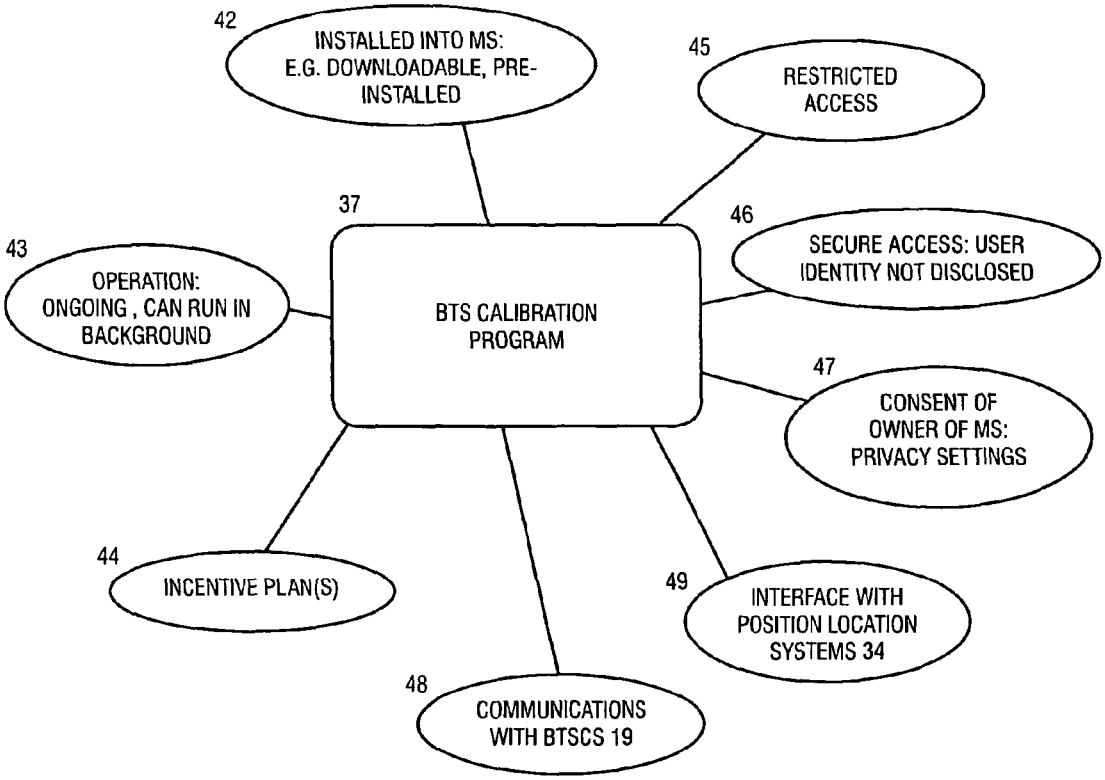
FIG. 4 is a diagram of BTS calibration program, illustrating features of one embodiment.

FIG. 4 is a conceptual diagram of the BTS calibration program, illustrating features that may be implemented into the program. Generally one purpose of the BTS calibration program described herein is to provide a mechanism that utilizes the position measurements made at the mobile station used as a calibration tool to determine and calibrate the position and time reference of one or more base stations. The BTS calibration program is installed in the mobile station, and performs the operations described herein.

Installed into MS (42): Particularly, as shown at 42, the BTS calibration program is installed in the mobile station, typically as software. The BTS calibration program can be a downloadable software program, and/or it may include firmware embedded or programmed in the handset or any other suitable system for storing instructions. Although the BTS calibration program typically uses pre-existing systems in the handset such as the position location system, in some embodiments additional hardware features may be useful or necessary for effective operation.

Ongoing operation, can operate in background (43): As shown at 43, once installed, the BTS calibration program can operate on an ongoing basis, subject to control by the user as discussed below. Furthermore, subject to privacy considerations such as discussed below, the calibration program may operate in the background whenever the mobile station is powered on, and therefore in such embodiments the user is not aware of its operation. For example, the user may be able to make calls and download other information while the calibration is being performed.

Incentive Plan(s) (44): In one embodiment the user may be enrolled in an incentive plan as shown at 44. For example a user who authorizes the BTSCS or a mobile services manager such as an MPC to utilize the mobile station for base station calibration may be entitled to financial credits or other financial compensation, credits for future services, or additional services in exchange for allowing the BTSCS to use the location-related information provided by the mobile station. Any suitable basis for compensation can be arranged: for example a user can be compensated on a per-use basis, per-session basis, or on a flat rate.

Privacy Concerns (45, 46, 47): It is intended (although not required) that the BTS calibration program prevents unrestricted access by the BTSCS; particularly, access may be restricted as shown at 45. Features may be implemented that allow the handset to be used for calibration purposes only in a controlled, secure fashion as shown at 46, and with consent of the user as shown at 47. This consent can be obtained in any appropriate matter; for example it may be pre-authorized, and once authorized, position determination may be done in the background without active participation of the handset user. Pre-authorization may be obtained, for example over a particular period of time (e.g., 10 days or 30 days) or just for a particular session or sessions or when the user subscribes to the service.

Authorization may be implemented in any of a variety of ways: generally, there will be some privacy information (settings) stored in the mobile station and/or privacy proxy server residing in the service provider's network that indicate the user's willingness to allow use of the mobile station as a calibration device by the network. This information may also indicate the rules which apply to the disclosure of the user's identity and location information. For example, the user may want to be notified every instance location-related information is being requested by the BTSCS or any other entity. For example a privacy flag may be set in software or hardware, and the user would change the flag via any suitable interface (e.g., selection via a pull-down menu) depending upon whether or not authorization is provided. In another example, the privacy information may indicate the allowable frequency, the duration, and/or time of day when the mobile device can be used as a calibration tool.

To meet privacy concerns, the calibration program may run in a secure fashion in the background, to prevent unauthorized interception. One objective of secure operation as shown at 46 is to avoid disclosing the identity of the handset user, and particularly to avoid associating the user with the location while the handset is being used for calibration purposes. For such purposes, the calibration program may prohibit transmission of the identity of the handset user, electronic identity of the mobile station, and prohibit transmission of any other identifying information (other than position location information), to the BTSCS. Alternatively, the information may be encrypted using any suitable encryption system.

Communications with BTSCS (48): As shown at 48, the BTS calibration program also communicates with the BTSCS 19. For example, a calibration-enabled mobile station (a mobile station that has an operating BTS calibration program is termed "calibration-enabled") may be in communication with a base station that is networked with the BTSCS; therefore the calibration program communicates with the networked BTSCS via the mobile station's cellular communication system. For example, the calibration program can initiate a Mobile-Originated call flow as discussed in more detail with reference to FIG. 6, to report the required information to the BTSCS for BTS calibration. Alternatively, as discussed in more detail with reference to FIG. 7, the calibration program can respond to a network initiated (Mobile-Terminated) call flow from the BTSCS and report the requested calibration information back to the network. The BTSCS then can store the calibration measurements (in a CDMA network these would include base station PN codes and pilot phase residuals) associated with locations for post-processing.

Interface with position location systems (49): The BTS calibration program 19, as shown at 49, can interface with the position location system 34 via the mobile device control system 35 (FIG. 3). For example, the BTS calibration program in the mobile station can request calibration information (e.g., PPMs and other position-related measurements) from the position location system, and then provide it to the BTSCS for post-processing. If the requested calibration information is not available or not acceptable (for reasons such as poor Quality of Service (QoS)), the BTS calibration program can request the position location system to determine the mobile station's position, and can also request it to take the pilot phase measurements (PPMs) (residuals) associated with at least one base station. For economy of time, the BTS calibration program could request only PPM measurements from one or more target base stations specified by the BTSCS, rather than PPM measurements from all base stations in range of the mobile station. In selecting PPM measurements, the calibration program may select only strong (direct) PPMs, which are better suited for accurate base station positioning and calibration. To select elite desirable PPMs, the QoS can be set to the desired accuracy threshold (e.g., a few meters) or in terms of other parameters such as signal strength, power, SNR, SIR, and so forth.

Figure 5:
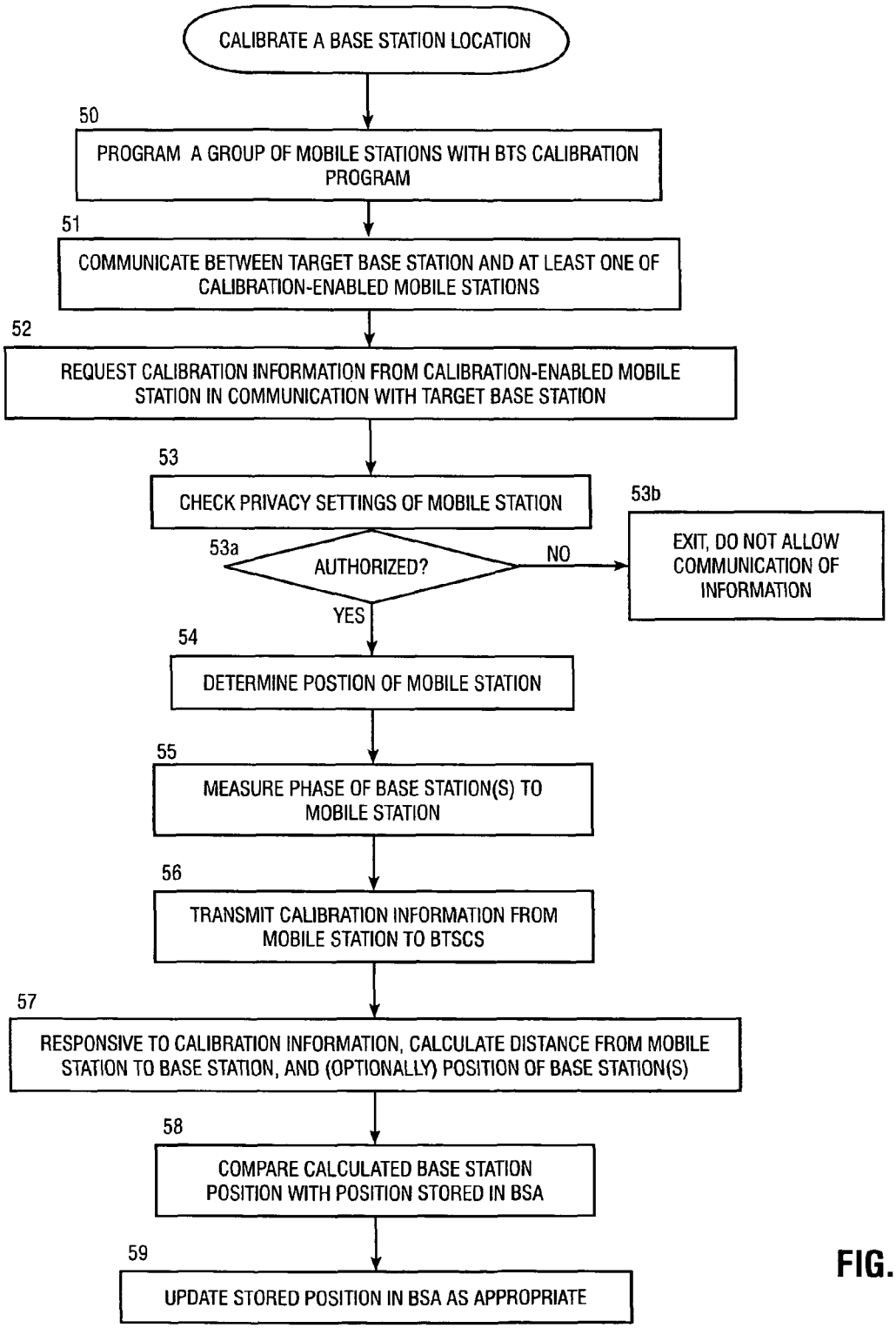
FIG. 5 is a flow chart of operations to calibrate a base station location.

FIG. 5 is a flow chart of operations to calibrate a base station location.

At 50, a group of mobile stations are programmed with the BTS calibration program. Each of these mobile stations is termed a "calibration-enabled" mobile station.

At 51, communication is established between a target base station, such as may be chosen by the BTSCS, and at least one of the calibration-enabled mobile stations. It may be noted that, at any one time, there may be more than one calibration-enabled mobile station within the coverage area of the target base station, and the operations of FIG. 5 may be repeated in each of these calibration-enabled mobile stations. Furthermore, it may be noticed that the exact time at which calibration information is provided is not relevant to the position of the base station; therefore a moving mobile station can be utilized multiple times at different locations to provide calibration information at each of the multiple locations. The information from multiple geographically-diverse locations is useful in determining base station location.

At 52, calibration information is requested. The request may be generated in any of a number of ways; for example the calibration information may be requested by the BTSCS 19, or it may be requested by the BTS calibration program. For example, the BTS calibration program may be programmed to transmit calibration information upon occurrence of a particular event. For example, one such particular event may be related to the mobile station communicating with a target base station or responding to an unrelated positioning event while in communication with a target base station. The calibration information may relate to a particular target base station that may be chosen (provided to the mobile station) by the BTSCS, it may relate to one or more target base stations, or it may relate to all mobile stations within range of the particular base station, or it may relate to the mobile stations that meet a particular criteria such as may be predetermined or established by the BTSCS.

At 53, privacy information is checked to determine if the mobile station is authorized to communicate calibration information. This step may take a variety of forms; for example a privacy flag may be checked by the calibration program before beginning communication with the BTSCS. In one example a privacy flag may be set in software or hardware, and the user would change the flag via any suitable interface (e.g., selection via a pull-down menu) depending upon whether or not authorization is provided.

At 53a, if authorization has not been given, then as shown at 53b, the operation is exited and no communication of calibration information is allowed with the BTSCS or the network. However, if authorization has been given, then operation moves to the next step 54.

At 54, the position of the mobile station is determined. This information may already be available if a position measurement has recently been made; if not then the BTS calibration program requests the mobile station to determine its position by any suitable means, such as by satellite, cellular network, local area network or a combination of whereof.

At 55, in a CDMA network the PPM from at least one base station to the mobile station is determined. This phase shift information may already be available if a position measurement has recently been made with PPM measurements; if not then the BTS calibration program requests the mobile station to determine this information. For economy of time, the BTS calibration program could request only PPM measurements from one or more target base stations specified by the BTSCS, rather that PPM measurements from all base stations in range of the mobile station. In selecting PPM measurements, the calibration program may select only strong (direct) PPMs, which are better suited for accurate base station positioning and calibration. To select elite PPMs, the QoS can be set to the desired accuracy threshold (e.g., a few meters) or in terms of other parameters such as signal strength, power, SNR, SIR, and so forth. In order to ensure the position information corresponds precisely with the PPM measurements, the PPM measurements should be taken as close in time if not simultaneously with the position fix. In the MS-assisted mode, the position information may be determined by the PDE.

At 56, calibration information is transmitted form the mobile station to the BTSCS. In a CDMA network, this calibration information includes at least position information of the mobile station, PN codes and PPM measurements from one or more base stations, which are useful to determine the distance from the target base station(s) to the mobile station. In an MS-assisted mode, the calibration information may be transmitted from the PDE to the BTSCS.

At 57, responsive to the calibration information, the distance from the mobile station to the base station(s) is calculated. If multiple mobile stations are providing calibration information, and/or if multiple positions have been reported by single mobile station, the position of the target base station (s) may also be calculated. Generally, the position and/or the timing information of the base station(s) can be determined once a sufficient number of measurements have been received or aggregated over time and devices.

At 58, the base station almanac is consulted for position information on the base station(s) whose distance from the mobile station and/or position has been calculated in the previous step 57. The almanac information is then examined for consistency with the calculated information. The consistency check can be performed for the particular target base station.

At 59, responsive to the consistency between the almanac and calculated information, the position of the base station in the base station almanac may be updated. Whether or not it is actually updated depends upon a number of factors, and typically the almanac information would not be updated without a high level of assurance of the accuracy of the calculated base station to calibration-enabled mobile station distances and/or position, such as by multiple consistent measurements over a period of time, and/or from a number of different mobile stations.

Finally, it should be noted that BTS positioning and calibration can be an on-going process as long as there are handsets reporting calibration measurements. It should also be appreciated that the steps 56 and 57 can be performed in the calibration-enabled mobile station whereby the calibration information transmitted to the BTSCS may also include the errors in the distance measurements from the mobile station to the target base station.

Figure 6:
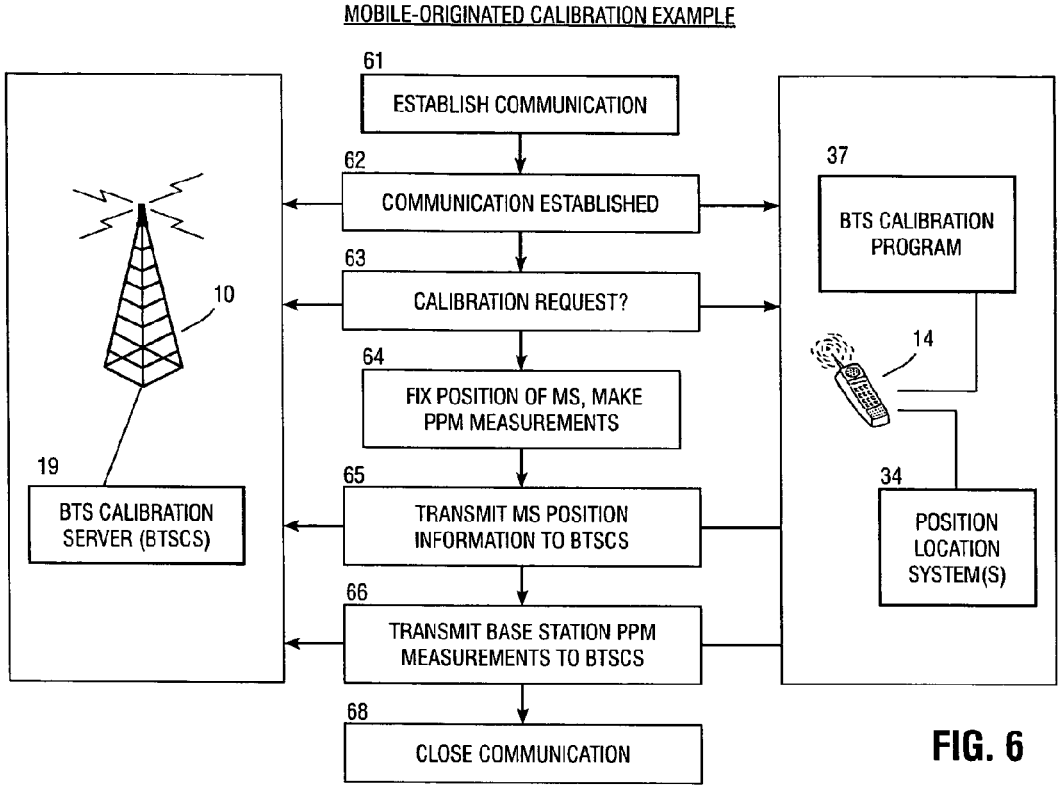
FIG. 6 is a flow chart of an example of a mobile-originated calibration process.

FIG. 6 is a flow chart of an example of a mobile-originated MS-based (or autonomous) calibration process. In one example, the mobile station may initiate mobile-originated calibration process, once the calibration program determines that the target base station is in the base station neighbor list. At 61, the mobile station initiates communication, and then two-way communication is established as shown at 62. At 63, the MS queries the BTSCS if a calibration information can be provided, and if the BTSCS signals its readiness, at 64 the position of the MS is determined and calibration (PPM) measurements are made. At 65, the MS position information is transmitted to the BTSCS, and at 66, the calibration (PPM) measurements are transmitted to the BTSCS. At 68, the communication between the MS and the base station 10 is closed down, which is particularly useful in the instance where a dedicated base station calibration session was established for the purpose of sending calibration information, and that purpose has now been met.

Figure 7:
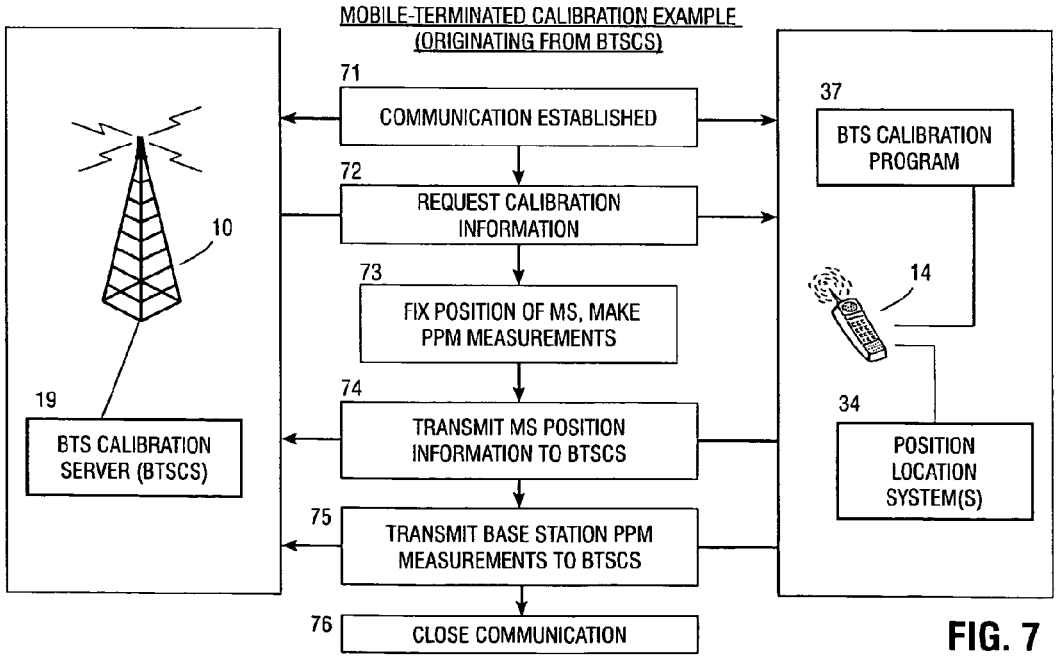
FIG. 7 is a flow chart of an example of a mobile-terminated calibration process, which differs from FIG. 6 in that the request originates in the BTSCS.

FIG. 7 is a flow chart of an example of a mobile-terminated MS-based (or autonomous) calibration process, which differs from FIG. 6 in that the calibration request originates in the BTSCS. At 71, two-way communication has been established. At 72, the BTSCS 19 requests calibration information from the MS 14. At 73, the position of the MS is determined and PPM measurements are made. At 74, the MS position information is transmitted to the BTSCS, and at 75, the PPM measurements are transmitted to the BTSCS. In one example, steps 74 and 75 may be combined. At 76, the communication between the MS and the base station 10 is closed down, which can be useful for example if a dedicated connection was established for the calibration purpose.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

What is claimed is:

1. In a wireless communication network that includes a plurality of mobile stations in communication with one or more base stations, a method of determining a position of a base station, comprising:

a. programming a group of mobile stations with a BTS calibration program, thereby providing a plurality of calibration-enabled mobile stations, wherein each mobile station has a user, and wherein said step of programming a group of mobile stations with the calibration program comprises obtaining consent of the users of said group of mobile phones and then downloading the BTS calibration program into said group of mobile phones;

b. providing a BTS calibration server networked with said base station;

c. requesting calibration information from at least one of said calibration-enabled mobile stations in communication with a base station;

d. determining a position of said calibration-enabled mobile station(s) in communication with said base station;

e. receiving a signal from said base station to said mobile station(s) in communication with said base station;

f. transmitting calibration information indicative of said position and said signal from said mobile station(s) to the BTS calibration server; and g. in said BTS calibration server, comparing the calibration information with base station almanac information associated with said base station, and calibrating the position of said base station responsive thereto.

2. The method of claim 1 and further comprising a step of determining if the mobile station is authorized to communicate calibration information, if there is no authorization then exiting operation before transmitting calibration information, otherwise completing operation.

3. The method of claim 2, wherein each mobile station has a user, and wherein said users of said calibration-enabled mobile phones utilize the BTS calibration program to create privacy settings to indicate authorization to provide calibration information, and said step of determining if the mobile station is authorized to communicate calibration information further comprises checking said privacy settings to verify that the mobile station is authorized to provide calibration information.

4. The method of claim 1 wherein said step of obtaining consent of the users further comprises creating privacy settings to indicate authorization to provide calibration information.

5. The method of claim 1 wherein said step of requesting calibration information is initiated by said BTS calibration program when in communication with said base station.

6. The method of claim 1 wherein said step of requesting calibration information comprises communicating from said BTS calibration server to at least one of the software-enabled mobile stations.

7. The method of claim 1 wherein said BTSCS selects a target base station, said step of requesting calibration information comprises communicating from said BTS calibration server to at least one of the calibration-enabled mobile stations in communication with the target base station.

8. The method as claimed in claim 1, wherein the mobile stations have global satellite receivers, and the positions of the mobile stations are determined from signals received by the mobile stations from global satellites.

9. The method as claimed in claim 1, wherein the positions of the mobile stations are determined by Advanced Forward Link Trilateration (AFLT) of each mobile station from base stations having known positions.

10. The method as claimed in claim 1, wherein the mobile stations comprise hybrid telephone handsets including global satellite receivers, the positions of the mobile stations are determined from signals received by the mobile stations from global satellites, and the position of the base station is determined from the positions of the mobile stations using time difference of arrival.

11. The method as claimed in claim 10 wherein said time difference of arrival is provided using Advanced Forward Link Trilateration (AFLT).

12. The method as claimed in claim 1, wherein the mobile stations comprise hybrid telephone handsets including global satellite receivers, the positions of the mobile stations are determined from signals received by the mobile stations from global satellites, said base stations comprise at least one Wireless LAN base station, and the position of said Wireless LAN base station is determined from the positions of the mobile stations in communication with said Wireless LAN base station, using Wireless LAN signals.

13. The method of claim 12 wherein the Wireless LAN base station comprises a WiFi access point.

14. The method as claimed in claim 1, wherein the step of receiving a signal from said base station to said mobile station includes measuring signal path delays of the signals transmitted between the base station and the mobile stations to determine distances between the base station and the mobile stations.

15. The method of claim 14 wherein said step of receiving a signal comprises measuring the time difference of arrival of said signal using TDOA system.

16. The method as claimed in claim 15 wherein said step of measuring the time difference of arrival comprises measuring a phase shift using an AFLT system.

17. The method of claim 14 wherein said step of receiving a signal comprises measuring the time of arrival of said signal using a TOA system.

18. The method of claim 14 wherein said step of receiving a signal comprises measuring the round trip delay of said signal between said base station and said mobile station.

19. The method of claim 1 wherein said step of comparing said calibration information comprises calculating a distance from said mobile station(s) to said base station.

20. The method of claim 1 wherein said step of comparing said calibration information comprises determining an error in the distance from said mobile station(s) to said base station.

21. The method of claim 1 wherein said step of calibrating the position of said base station comprises updating almanac information associated with said base station.

22. The method as claimed in claim 1, wherein the position of the base station antenna determined from the positions of the mobile stations is compared to a position for the base station contained in a base station almanac in order to verify the position for the base station contained in the base station almanac.

23. A wireless communication network comprising:

a. a plurality of base stations, each having a unique location;

b. a BTS calibration server networked with said plurality of base stations;

c. a plurality of calibration-enabled mobile stations wirelessly communicating with at least one of said base stations, each of said calibration-enabled mobile stations having a BTS calibration program and a position location system for determining its position, and a means for receiving a signal from said base station to said mobile station;

d. means for requesting calibration information from at least one of said calibration-enabled mobile stations in communication with a base station;

e. means for determining if the mobile station is authorized to communicate calibration information, wherein said BTS calibration program provides privacy settings stored in said mobile station to indicate authorization to provide calibration information, and said means for determining if the mobile station is authorized to communicate calibration information farther comprises checking said privacy settings to verify that the mobile station is authorized to provide calibration information;

f. means for transmitting calibration information indicative of said position and said signal from said mobile station (s) to the BTS calibration server;

g. a base station almanac networked with said plurality of base stations and said BTS calibration server; and h. means, in said BTS calibration server, for calculating a distance from said mobile station(s) to said base station, comparing it with base station almanac information associated with said base station, and calibrating the position of said base station responsive thereto.

24. The network as claimed in claim 23, wherein the position location system comprises a TDOA system for measuring distance.

25. The network as claimed in claim 23, wherein the position location system comprises a RTD system for measuring distance.

26. The network as claimed in claim 23, wherein the position location system comprises a TOA system for measuring distance.

27. The network as claimed in claim 23, wherein the position location system in said mobile stations include global satellite receivers, so that the positions of the mobile stations can be determined from signals received by the mobile stations from global satellites.

28. The network as claimed in claim 23, wherein the position location system in said mobile stations include an Advanced Forward Link Trilateration (AFLT) system that determines the positions of the mobile stations from base stations having known positions.

29. The network as claimed in claim 23, wherein the mobile stations comprise hybrid telephone handsets including global satellite receivers and AFLT systems.

30. The network of claim 23, wherein the means for calibrating the position of said base station comprises means for updating almanac information associated with said base station.

31. In a wireless communication network that includes a plurality of mobile stations in communication with one or more base stations, a method of determining a position of a base station, comprising:

a. programming a group of mobile stations with a BTS calibration program, thereby providing a plurality of calibration-enabled mobile stations wherein each mobile station has a user, and wherein said users of said calibration-enabled mobile phones utilize the BTS calibration program to create privacy settings to indicate authorization to provide calibration information;

b. providing a BTS calibration server [networked with said base station];

c. requesting calibration information from at least one of said calibration-enabled mobile stations in communication with a base station, and determining if the mobile station is authorized to communicate calibration information, including checking said privacy settings to verify that the mobile station is authorized to provide calibration information [, and if there is no authorization then exiting operation before transmitting calibration information, otherwise completing operation];

d. determining a position of said calibration-enabled mobile station(s) in communication with said base station;

e. receiving a signal from said base station to said mobile station(s) in communication with said base station;

f. transmitting calibration information indicative of said position and said signal from said mobile station(s) [to the BTS calibration server]; and g. in said BTS calibration server, comparing the calibration information with base station almanac information associated with said base station, and calibrating the position of said base station responsive thereto.

32. The method as claimed in claim 31, wherein the mobile stations have global satellite receivers, and the positions of the mobile stations are determined at least in part from signals received by the mobile stations from global satellites.

33. The method as claimed in claim 31, wherein the positions of the mobile stations are determined at least in part by Advanced Forward Link Trilateration (AFLT) of each mobile station from base stations having known positions.

34. The method of claim 31 wherein the base station comprises a WiFi access point.

35. The method of claim 31 wherein said step of comparing said calibration information comprises calculating a distance from said mobile station(s) to said base station, and determining an error in the distance from said mobile station(s) to said base station.

36. The method of claim 31 wherein said step of calibrating the position of said base station comprises updating almanac information associated with said base station.

*37. A method of maintaining accurate base station location information in a wireless communications system, comprising:*

*receiving, at a mobile station, a request to report location calibration information related to at least one base station to a base station location calibration server, the requested location calibration information including at least a location estimate of the mobile station and information indicative of the mobile station's distance to the at least one base station;*

*determining position information sufficient to calculate the location estimate of the mobile station;*

*determining the information indicative of the mobile station's distance to the at least one base station; and*

*sending the requested location calibration information to the base station location calibration server.*

*38. The method of claim 37, further comprising:*

*determining whether the mobile station is authorized to send the requested calibration information to the base station location calibration server,*

*wherein the sending step is performed if the mobile station is determined to be authorized.*

*39. The method of claim 37, wherein the receiving step receives the request from a calibration program that is being executed on the mobile station.*

*40. The method of claim 39, wherein the calibration program generates the request in response to a detected event.*

*41. The method of claim 40, wherein the detected event corresponds to the mobile station being in communication with the at least one base station.*

*42. The method of claim 37, wherein the receiving step receives the request from the base station location calibration server.*

*43. The method of claim 37, wherein the at least one base station includes a current serving base station of the mobile station.*

*44. The method of claim 37, wherein the at least one base station includes each base station detected at the mobile station.*

*45. The method of claim 37, wherein a position determination entity (PDE) assists the mobile station in determining the location estimate.*

*46. The method of claim 37, wherein the mobile station determines the location estimate without assistance from a position determination entity (PDE).*

*47. The method of claim 37, wherein the base station location calibration server is separate from a position determination entity (PDE) that is configured to assist mobile stations determine their location.*

*48. The method of claim 37, wherein the determining the location estimate of the mobile station is based on a wide area network (WAN) time difference of arrival (TDOA) protocol, a satellite position system (SPS) protocol or a hybrid system.*

*49. The method of claim 48, wherein the WAN TDOA protocol corresponds to an Advance Forward Link Trilateration (AFLT) protocol, the SPS protocol corresponds to a Global Positioning System (GPS) protocol and the hybrid system corresponds to a hybrid GPS/AFLT protocol.*

*50. The method as claimed in claim 37, wherein the mobile station comprises a hybrid telephone handset including a global satellite receiver, the position of the mobile station is determined from signals received by the mobile station from global satellites, said at least one base station comprises at least one Wireless LAN base station, and the position of said Wireless LAN base station is determined from the position of the mobile station in communication with said Wireless LAN base station, using Wireless LAN signals.*

*51. The method of claim 50, wherein the Wireless LAN base station comprises a WiFi access point.*

*52. The method of claim 37, wherein the information indicative of the mobile station's distance to the at least one base station corresponds is determined based on (i) measuring a phase shift in one or more downlink pilot signals from the at least one base station in accordance with an Advance Forward Link Trilateration (AFLT) protocol, (ii) measuring a time of arrival (TOA) of one or more downlink signals in accordance with a TOA protocol, and/or (iii) measuring a round-trip delay of one or more signals exchanged between the mobile station and the at least one base station.*

*53. The method of claim 37, wherein the sending step includes:*

*establishing a dedicated base station calibration session with the base station location calibration server for the primary purpose of sending the requested calibration information.*

*54. A method of maintaining accurate base station location information in a wireless communications system, comprising:*

*receiving, at a base station location calibration server, location calibration information related to at least one base station, the location calibration information including at least a location estimate of one or more mobile stations and information indicative of the one or more mobile stations' distance to at least one base station;*

*determining a location of the at least one base station based at least in part on the received location calibration information;*

*selectively updating a record of the at least one base station's location within a base station almanac based on the determined location of the at least one base station, the base station almanac configured to store locations of base stations of a wireless communication system.*

*55. The method of claim 54, wherein the location calibration information is sent from the one or more mobile stations responsive to a request initiated by a calibration program that is being executed on the one or more mobile stations.*

*56. The method of claim 54, further comprising:*

*sending a request for the location calibration information to each of the one or more mobile stations,*

*wherein the receiving step receives the location calibration information from the one or more mobile stations in response to the request.*

*57. The method of claim 54, wherein the at least one base station includes a current serving base station of one or more mobile stations.*

*58. The method of claim 57, wherein the at least one base station includes each base station detected by the one or more mobile stations.*

*59. The method of claim 54, wherein the location estimate of the mobile station is based on a wide area network (WAN) time difference of arrival (TDOA) protocol, a satellite position system (SPS) protocol or a hybrid system.*

*60. The method of claim 59, wherein the WAN TDOA protocol corresponds to an Advance Forward Link Trilateration (AFLT) protocol, the SPS protocol corresponds to a Global Positioning System (GPS) protocol and the hybrid system corresponds to a hybrid GPS/AFLT protocol.*

*61. The method of claim 54, wherein the information indicative of the mobile station's distance to the at least one base station corresponds is based on (i) a phase shift in one or more downlink pilot signals from the at least one base station as measured at the one or more mobile stations in accordance with an Advance Forward Link Trilateration (AFLT) protocol, (ii) a time of arrival (TOA) of one or more downlink signals as measured at the one or more mobile stations in accordance with a TOA protocol, and/or (iii) a round-trip delay of one or more signals exchanged between the mobile station and the at least one base station.*

*62. The method of claim 54, wherein the sending step includes:*

*establishing a dedicated base station calibration session with the one or more mobile stations for the primary purpose of receiving the requested calibration information.*

*63. The method of claim 54, wherein the determining step determines the location of the at least one base station based on multiple instances of the location calibration information,*

*such that the location estimate of the at least one base station is triangulated from multiple indications of a given mobile station's distance to a given base station from a particular geographic location.*

*64. The method of claim 63, wherein the multiple instances of the location calibration information are either (i) received from the same mobile station at different locations, (ii) from different mobile stations at different locations, (iii) or a combination thereof.*

*65. The method of claim 54, wherein the selectively updating step includes:*

*comparing the determined location of the at least one base station with a previously stored location of the at least one base station in the base station almanac; and*

*replacing the previously stored location of the record with the determined location based at least in part on the comparing step.*

*66. The method of claim 54, wherein the base station location calibration server is separate from a position determination entity (PDE) that is configured to assist mobile stations determine their location.*

*67. The method as claimed in claim 54, wherein the one or more mobile stations comprise a hybrid telephone handset including a global satellite receiver, the position of the one or more mobile stations are determined from signals received by the one or more mobile stations from global satellites, said at least one base station comprises at least one Wireless LAN base station, and the position of said Wireless LAN base station is determined from the position of the mobile station in communication with said Wireless LAN base station, using Wireless LAN signals.*

*68. The method of claim 67, wherein the Wireless LAN base station comprises a WiFi access point.*

*69. The method of claim 54, wherein the location of the at least one base station that is determined by the determining step corresponds to a geographical position of the at least one base station.*

*70. A mobile station in a wireless communications system, comprising:*

*means for receiving a request to report location calibration information of at least one base station to a base station location calibration server, the requested location calibration information including at least a location estimate of the mobile station and information indicative of the mobile station's distance to the at least one base station;*

*means for determining position information sufficient to calculate the location estimate of the mobile station; and*

*means for determining the information indicative of the mobile station's distance to the at least one base station; and*

*means for sending the requested location calibration information to the base station location calibration server.*

*71. A base station location calibration server configured to maintain accurate base station location information in a wireless communications system, comprising:*

*means for receiving location calibration information related to at least one base station, the location calibration information including at least a location estimate of one or more mobile stations and information indicative of the one or more mobile stations' distance to at least one base station;*

*means for determining a location of the at least one base station based at least in part on the received location calibration information;*

*means for selectively updating a record of the at least one base station's location within a base station almanac based on the determined location of the at least one base station, the base station almanac configured to store locations of base stations of a wireless communication system.*

*72. A mobile station in a wireless communications system, comprising:*

*a receiver configured to receive a request to report location calibration information of at least one base station to a base station location calibration server, the requested location calibration information including at least a location estimate of the mobile station and information indicative of the mobile station's distance to the at least one base station;*

*a positioning location system configured to determine position information sufficient to calculate the location estimate of the mobile station and further configured to determine the information indicative of the mobile station's distance to the at least one base station; and*

*a transmitter configured to send the requested location calibration information to the base station location calibration server.*

*73. A base station location calibration server configured to maintain accurate base station location information in a wireless communications system, comprising:*

*an interface configured to receive location calibration information related to at least one base station, the location calibration information including at least a location estimate of one or more mobile stations and information indicative of the one or more mobile stations' distance to at least one base station; and*

*a processor configured to determine a location of the at least one base station based at least in part on the received location calibration information and further configured to selectively update a record of the at least one base station's location within a base station almanac based on the determined location of the at least one base station, the base station almanac configured to store locations of base stations of a wireless communication system.*

*74. A non-transitory computer-readable storage medium comprising instructions, which, when executed by a mobile station in a wireless communications system, cause the mobile station to perform operations, the instructions comprising:*

*program code to receive a request to report location calibration information of at least one base station to a base station location calibration server, the requested location calibration information including at least a location estimate of the mobile station and information indicative of the mobile station's distance to the at least one base station;*

*program code to determine position information sufficient to calculate the location estimate of the mobile station; and*

*program code to determine the information indicative of the mobile station's distance to the at least one base station; and*

*program code to send the requested location calibration information to the base station location calibration server.*

*75. A non-transitory computer-readable storage medium comprising instructions, which, when executed by a base station location calibration server configured to maintain accurate base station location information in a wireless communications system, cause the base station location calibration server to perform operations, the instructions comprising:*

*program code to receive location calibration information related to at least one base station, the location calibration information including at least a location estimate of one or more mobile stations and information indicative of the one or more mobile stations' distance to at least one base station;*

*program code to determine a location of the at least one base station based at least in part on the received location calibration information;*

*program code to selectively update a record of the at least one base station's location within a base station almanac based on the determined location of the at least one base station, the base station almanac configured to store locations of base stations of a wireless communication system.*

* * * * *